United States Patent [19]

Milwain

[11] Patent Number: 4,577,843
[45] Date of Patent: Mar. 25, 1986

[54] VEHICLE DOOR SUPPORT

[76] Inventor: Donald R. Milwain, General Delivery, Hwy. 48, Baldwin, Ontario, Canada, L0E 1A0

[21] Appl. No.: 651,142

[22] Filed: Sep. 17, 1984

[30] Foreign Application Priority Data

Feb. 27, 1984 [CA] Canada .................................. 449581

[51] Int. Cl.⁴ .............................................. B23Q 1/04
[52] U.S. Cl. ....................................... 269/51; 269/296
[58] Field of Search .................................... 269/50-52, 269/71, 76, 74, 296, 236

[56] References Cited

U.S. PATENT DOCUMENTS

| | | | |
|---|---|---|---|
| 1,351,232 | 8/1920 | Collins | 269/50 |
| 1,614,697 | 1/1927 | Snook | 269/51 |
| 1,812,585 | 6/1931 | Collins | 269/296 |
| 2,568,508 | 9/1951 | Montague | 269/51 |
| 2,973,198 | 2/1961 | Marks | 269/51 |
| 2,997,292 | 8/1961 | Lucker et al. | 269/296 |
| 3,048,387 | 8/1962 | Waggoner | 269/51 |
| 4,145,006 | 3/1979 | Webb | 269/71 |

Primary Examiner—Robert C. Watson
Attorney, Agent, or Firm—Arne I. Fors; Robert F. Delbridge

[57] ABSTRACT

An apparatus for adjustably supporting a vehicle door at a convenient height whereby the door can be rotated through a generally horizontal axis passing through the door to a desired work position. The support apparatus comprises a pair of spaced-apart stands, one stand having mounting means in the form of an elongated connector pivotally secured thereto on a rotatable axle and adapted to be secured to one edge of the door by means of bolts threaded into bolt holes normally used for securement of the door hinges, and the other stand having a horizontal spindle secured thereto adapted to be received in the closable recess of the door locking mechanism on the opposite edge of the door for rotation of the door about the spindle. Each of the stands is adjustable as to height whereby the axis of the spindle and the axis of rotation of the axle secured to the elongated connector can be normally horizontally aligned.

6 Claims, 3 Drawing Figures

VEHICLE DOOR SUPPORT

This invention relates to work holders for adjustably supporting a workpiece and, more particularly, relates to an apparatus for adjustably supporting a vehicle door.

A vehicle door is often laid on support members such as wooden beams or metal work benches for support when worked upon. The fabric and leather interior of the door can be subject to damage by rough and abrasive support surfaces or marked by exposure to grease and dirt. In addition, positioning of the door to facilitate repair usually is difficult and time consuming.

Work holders for supporting a workpiece are known. U.S. Pat. No. 4,183,511 discloses, for example, a supporting apparatus for adjustably holding a vehicle door, said apparatus including suction members engageable with the workpiece for support thereof. The suction members must engage a smooth surface, normally the exterior side of the door, and thus often obstruct the surface to be worked on.

It is a principal object of the present invention to provide an apparatus for adjustably supporting a vehicle door at a convenient height whereby the door can be rotated through a generally horizontal axis passing through the door to a desired work position.

In its broad aspect, the support apparatus of the present invention comprises a pair of spaced-apart stands, one stand having mounting means in the form of an elongated connector pivotally secured thereto on a rotatable axle and adapted to be secured to one edge of the door by means of bolts threaded into bolt holes normally used for securement of the door hinges, and the other stand having a horizontal spindle secured thereto adapted to be received in the closable recess of the door locking mechanism on the opposite edge of the door for rotation of the door about the spindle. Each of the stands is adjustable as to height whereby the axis of the spindle and the axis of rotation of the axle secured to the elongated connector can be normally horizontally aligned.

The stand containing the elongated connector mounted on an axle, said axle in effect functioning as a live or control spindle, has locking means for securing the axle and elongated connector in a fixed angular position whereby the door can be securely held in a desired work position.

Other objects of the invention and the manner in which they can be attained will become apparent from the following detailed description of the drawings, in which.

Figure 1:
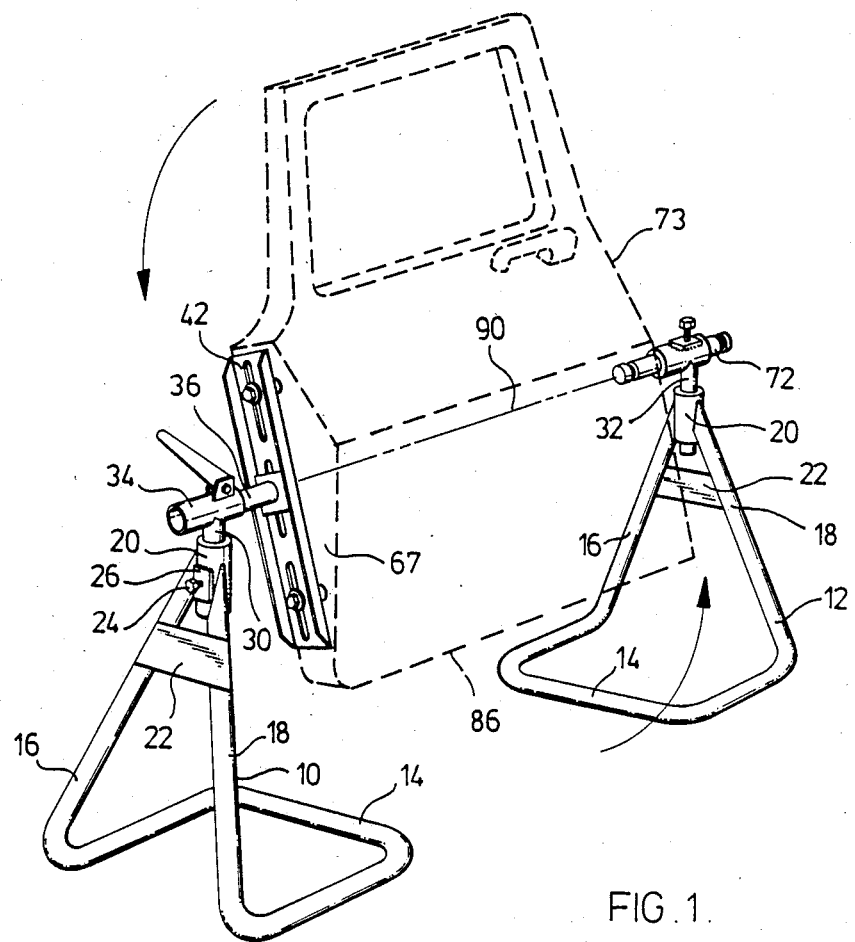
FIG. 1 is a perspective view of a preferred embodiment of the present invention in its operative position showing a vehicle door by ghost lines.

With reference to FIG. 1, the support apparatus of the invention comprises a pair of stands 10,12 formed of tubular steel each having a generally U-shaped base 14 and a pair of converging upwardly extending side struts 16,18 terminating at an upright collar 20 secured thereto by a weld. Converging side struts 16,18 preferably are inclined inwardly over base 14 whereby collar 20 is located over a central section of the base. A reinforcing cross member 22 may be secured to side struts 16,18 to provide additional rigidity thereto.

Each of support stands 10,12 has a bolt 24 threaded into reinforcing plate 26 and through the collar 20 for abutment against tubular members 30,32 to permit vertically adjusting and locking members 30,32 respectively therein for reasons which will become apparent as the description proceeds.

Figure 2:
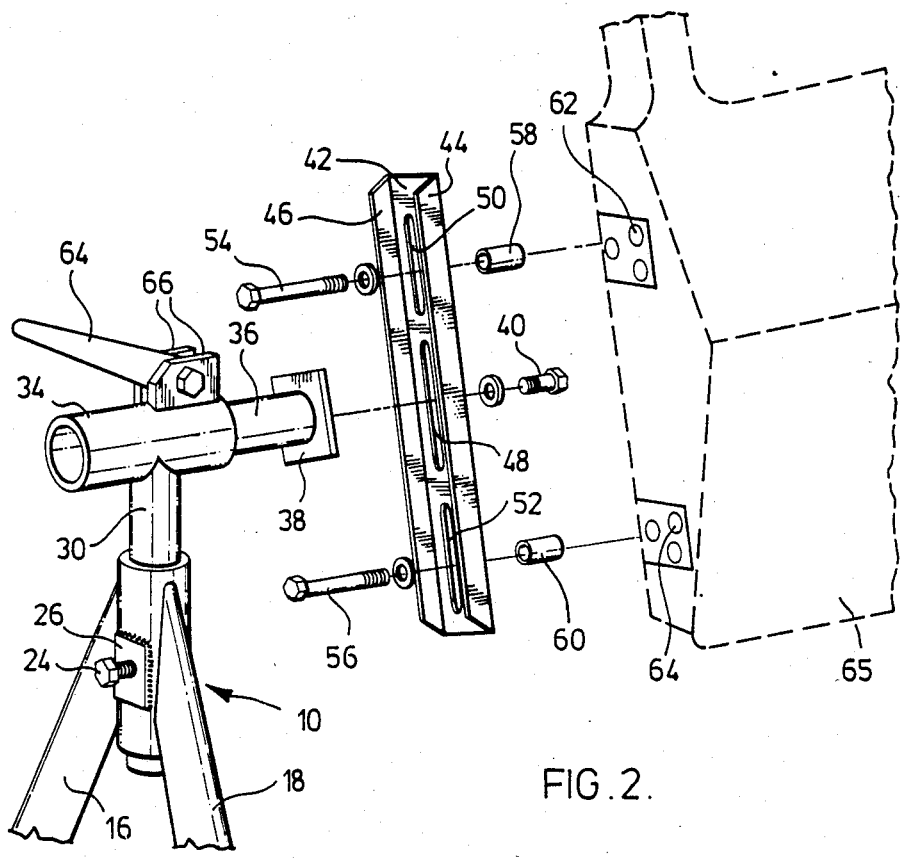
FIG. 2 is an exploded perspective view, partly cut away, showing the upper portion of one support stand of the invention having an elongated connector adapted to be secured to one edge of a vehicle door.

Stand 10 has a transverse collar 34 secured to the upper end of upright member 30 adapted to receive in sliding engagement a cantilever axle or live spindle 36, shown more clearly in FIG. 2. The free end of axle 36 has a plate 38 rigidly secured thereto adapted to receive threaded bolt 40 for securement of elongated connector 42, connector 42 preferably in the shape of a channel having flanged sides 44,46 adapted to snugly receive the sides of plate 38 therebetween whereby elongated connector 42 and axle 36 can rotate conjointly about the longitudinal axis of axle 36 and the centre line of bolt 40.

Elongated connector 42 has an elongated central slot 48 to permit longitudinal adjustment of connector 42 on plate 38. The opposite ends of connector 42 have elongated slots 50,52 adapted to receive bolts 54,56 adapted to be threaded into hinge bolt holes 62,64 formed in one side edge of the vehicle door 65. Sleeves 58,60 space connector 42 a fixed distance from the edge 67 of door 65 to accommodate irregular door shapes.

A locking device such as cam lever 64 is pivotally mounted on spaced-apart flanges 66 secured to collar 34, cam lever 64 having a downwardly extending projection inserted into a longitudinal slot formed in collar 34, not shown, whereby pivoting of cam lever 64 in a clockwise direction as viewed in FIG. 2 frictionally engages lever 64 with axle 36 to prevent rotation of axle 36 and elongated connector 42 secured thereto.

Figure 3:
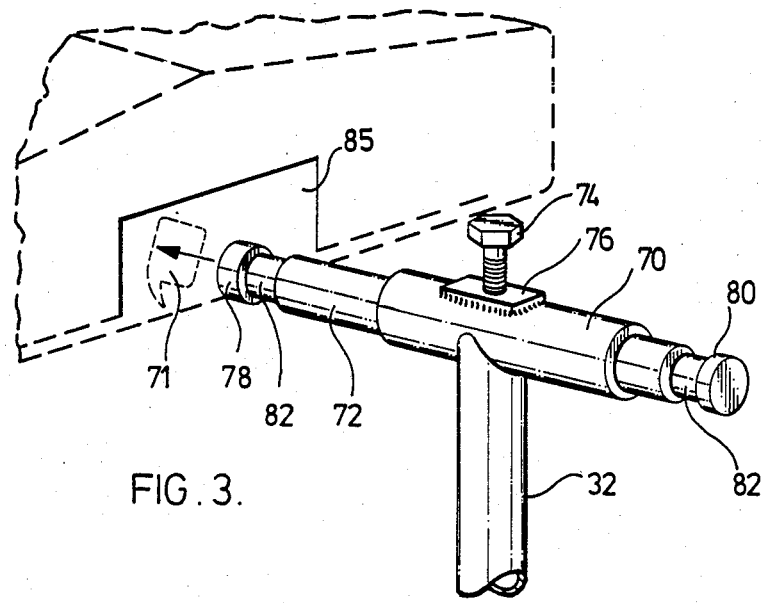
FIG. 3 is a perspective view of the upper portion of a support stand of the present invention having a spindle for securement by a door locking mechanism for rotation thereon.

With reference now to FIGS. 1 and 3, upright member 32 adjustably mounted in collar 20 by means of a threaded bolt, not visible, for vertical positioning has a transverse horizontal collar 70 secured thereto with a spindle 72 slidably inserted therein to form a cantilever support. Spindle 72 can be adjusted axially within collar 70 and locked at a desired position by means of bolt 74 threaded through reinforcing plate 76 and collar 70 for engagement with spindle 72. The opposite ends 78,80 of spindle 72 have peripheral recesses 82,84 formed at different distances from the free ends of the spindle for locking engagement by pivotal detents forming part of the door locking mechanism 85 located in the closable recess 71 formed in door edge 73, normally located within the central one-third of the side of the door.

In operation, elongated connector 46 is secured to the hinged side edge of a vehicle door by insertion of bolts 54,56 through sleeve spacers 58,60 into hinge bolt openings 62,64. Bolt 40 is positioned in a central portion of elongated connector 42 such that it is generally located about the same distance from the bottom edge 86 of the door 65 as the location of the door locking mechanism on the opposite edge. Axle 36 can then be slid into collar 34 of stand 10 and spindle 72 of stand 12 inserted into recess 71 and locked therein, collars 34 and 70 being generally horizontally aligned with each other on their respective stands whereby the axis depicted by numeral 90 in FIG. 1 is substantial coaxial with axle 36 and spindle 72.

The vehicle door can be pivoted about axis 90 to a desired position and axle 36 locked in a desired angular position by means of cam lever 64.

The present invention provides a number of important advantages. Vehicle doors can be readily supported at a desired position and adjusted about an axis of rotation to a desired work position. Damage or marking of the door can be minimized and the surfaces of the door to be worked upon are normally unobstructed permitting facile replacement of metal, application of body filler, and priming and spray painting.

The stands, when not in use, can be compactly stacked for storage.

It will be understood of course that modifications can be made in the embodiment of the invention illustrated and described herein without departing from the scope and purview of the invention as defined by the appended claims.

What I claim as new and desire to protect by Letters Patent of the United States is:

1. An apparatus for supporting a vehicle door having threaded holes on one edge for receiving bolts and a closable recess formed by the door locking mechanism on the opposite edge, said apparatus comprising, in combination:

first and second spaced-apart stands, said first stand having an elongated connector adapted to be secured to one edge of the door by bolts threaded into the holes, axle means for securing said connector to said stand for pivoting about a horizontal axis, and means for locking said securing means to prevent pivoting of the connector;

said second stand having a horizontal spindle secured to said stand adapted to be received in the closable recess of the door for rotation of the door about the spindle;

means for adjusting the height of the elongated connector and the spindle for substantial coaxial alignment of the connector axle means relative to the spindle about on axis passing through the door whereby the vehicle door can be pivoted and locked at a desired position about said axis, said elongated connector having a longitudinal slot formed at each end for receiving the bolts threaded into the door holes and a central longitudinal slot for receiving connecting means for securement of the axle means substantially perpendicular to the elongated connector.

2. An apparatus as claimed in claim 1 in which the first stand has a horizontal collar adapted to receive the axle therein for rotational movement, and a cam lever pivotally mounted on said collar adapted to pass through a slot formed in said collar for frictional engagement with the axle means to prevent rotation of the said axle means.

3. An apparatus as claimed in claim 2 in which said spindle has a recess formed in at least one end thereof adapted to be seated in the closable recess formed by the door locking mechanism whereby said spindle cannot be axially separated from said recess when closed.

4. An apparatus as claimed in claim 3 in which said spindle has a peripheral recess formed at each end at a different distance from the end of the spindle to accommodate door locking mechanisms of varying size.

5. An apparatus as claimed in claim 2 in which each of said stands has a generally U-shaped base and a pair of converging side struts extending upwardly from the base, and an upright collar secured to said side struts for receiving said means for adjusting the height of the elongated connector and the spindle.

6. An apparatus as claimed in claim 2 in which each of said stands has a generally U-shaped base and a pair of converging side struts extending upwardly from the base, said side struts inclined inwardly over the base whereby the collar is located over a central section of the base.

* * * * *